# United States

Chinnock et al.

4,029,390

June 14, 1977

[54] OPTICAL FIBER GROUP SPLICING TECHNIQUE AND APPARATUS EMPLOYING UNIQUE FOLDABLE HOLDER

[75] Inventors: Edwin Leroy Chinnock, Rumson; Detlef Christoph Gloge, Red Bank, both of N.J.

[73] Assignee: Bell Telephone Laboratories, Incorporated, Murray Hill, N.J.

[22] Filed: Dec. 23, 1974

[21] Appl. No.: 535,302

[52] U.S. Cl. .................. 350/96 C; 156/158; 350/96 WG
[51] Int. Cl.² .......................................... G02B 5/16
[58] Field of Search ......... 350/96 B, 96 C, 96 WG; 156/158, 159

[56] References Cited

UNITED STATES PATENTS

| | | | |
|---|---|---|---|
| 2,703,854 | 3/1955 | Eisler | 174/117 A |
| 3,134,844 | 5/1964 | Myers | 174/94 |
| 3,798,099 | 3/1974 | Marcatili | 350/96 C |
| 3,871,935 | 3/1975 | Gloge et al. | 350/96 B |

OTHER PUBLICATIONS

United States Published Patent App. B 408,380, filed 10/1973, inventor Miller.

*Primary Examiner*—John K. Corbin
*Assistant Examiner*—Stewart Levy
*Attorney, Agent, or Firm*—Thomas C. O'Konski; Bryan W. Sheffield

[57] ABSTRACT

In accordance with the disclosed invention, a first group of optical fiber waveguides is spliced to a second, similar group of optical fiber waveguides using a unique foldable holder. The holder illustratively comprises a relatively thin wafer formed of a bendable material, such as a plastic or metal, and includes first and second sections disposed about a centrally extended fold line. Each section of the holder includes a plurality of grooves laterally spaced in a parallel relation symmetrically about the fold line for receiving and aligning the individual fibers in each fiber group to be spliced. To achieve the desired splice, the fibers in a first group are placed and then fixed in the grooves of the first section of the holder, while the fibers in a second group are placed and then fixed in the grooves of the second section of the holder. The assembly is then placed in a fiber scoring and breaking tool which divides each of the fibers in the two groups along the same line perpendicular both to the fiber axes and to the holder fold line. The unwanted ends of the fiber groups are then removed from the holder and discarded, and the holder is folded about its fold line bringing the fibers in the first group in accurate alignment with the corresponding fibers of the second group to complete the splice.

10 Claims, 11 Drawing Figures

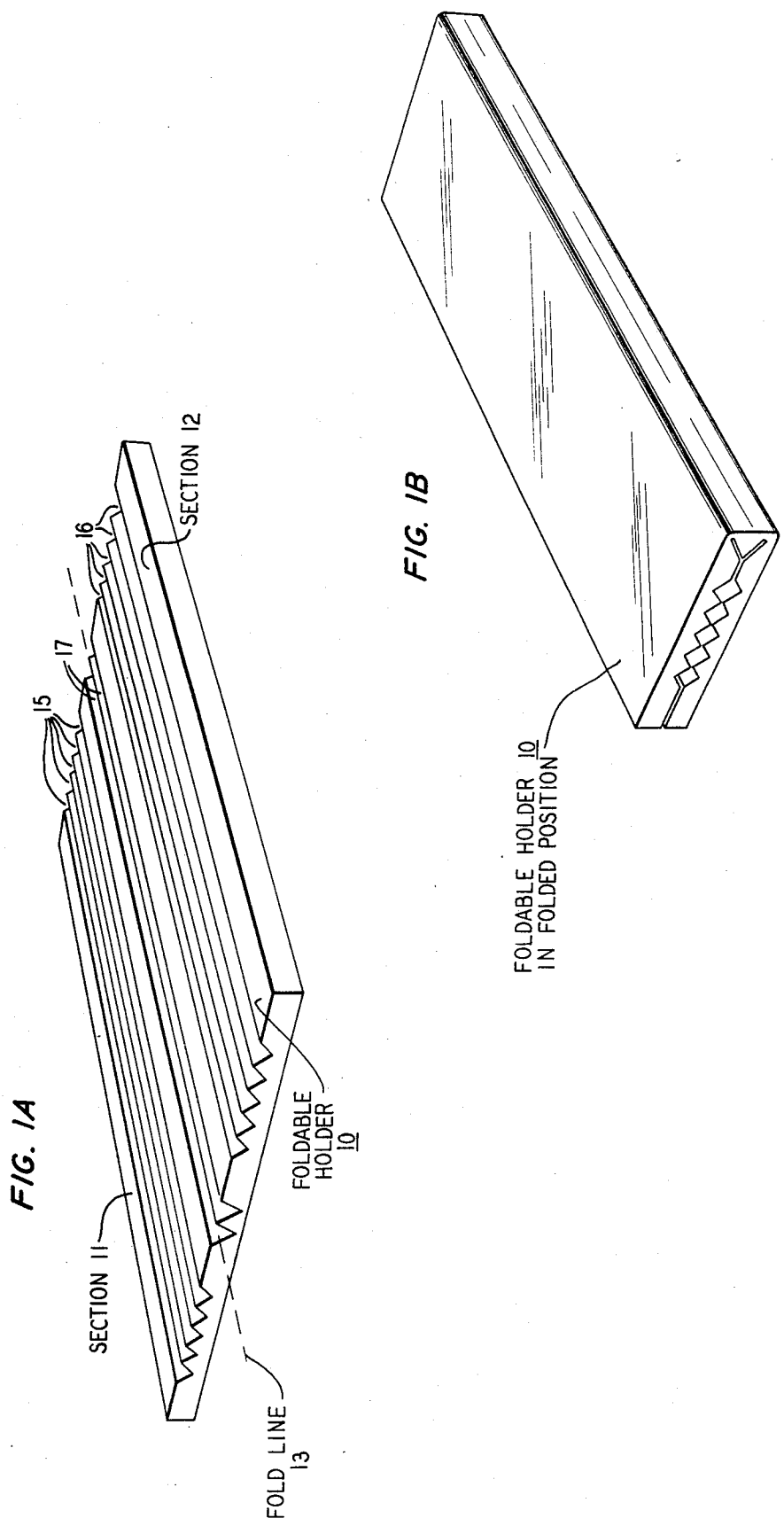

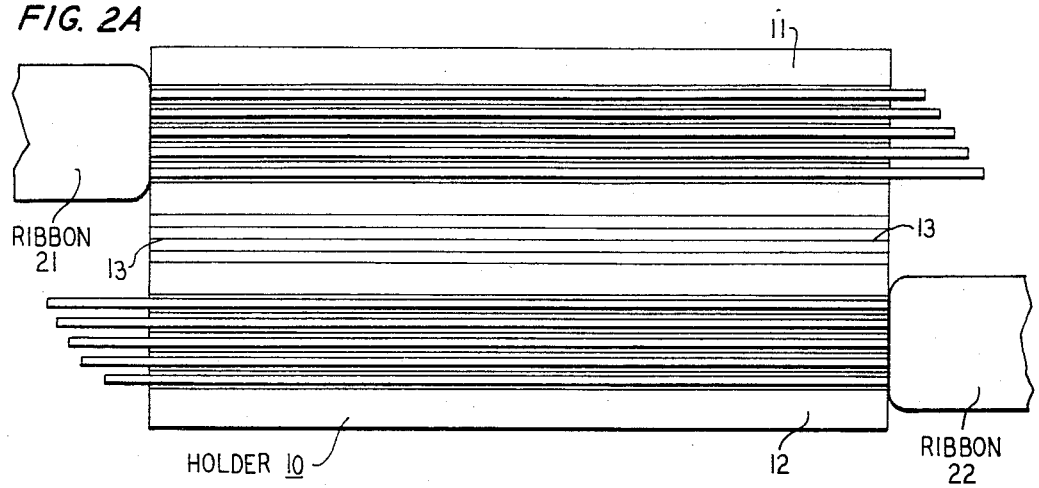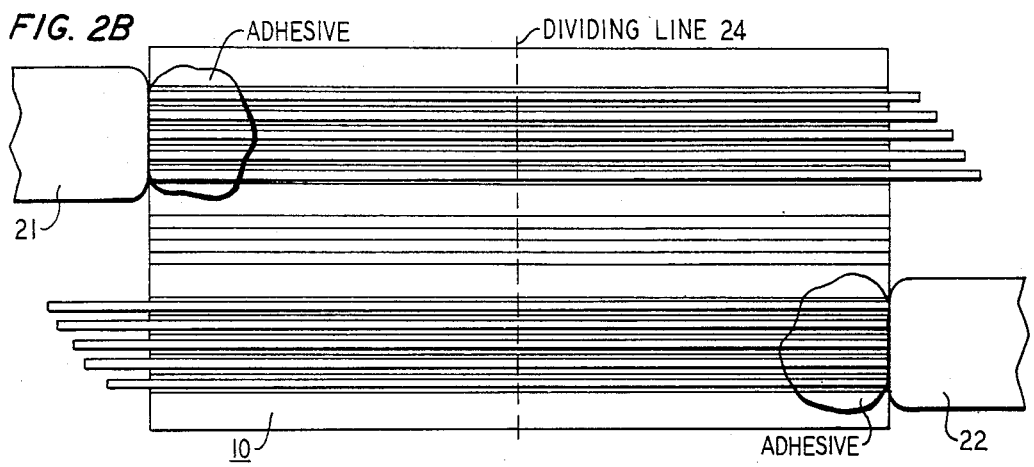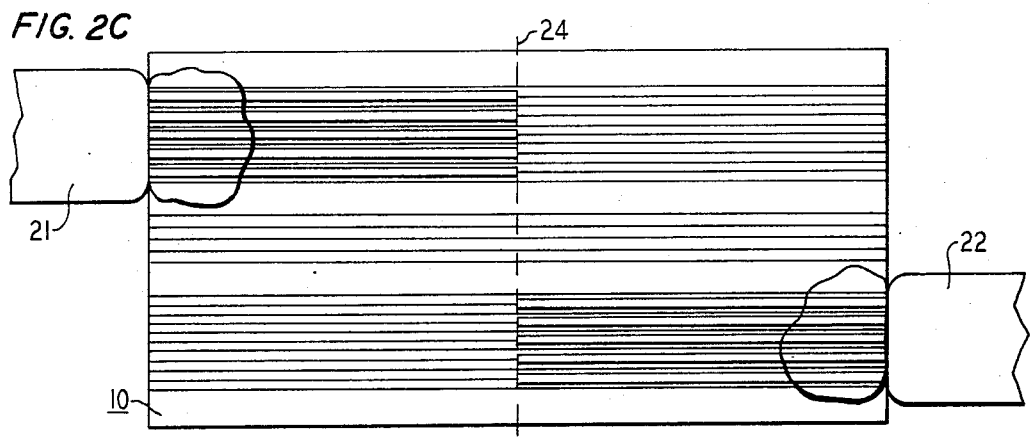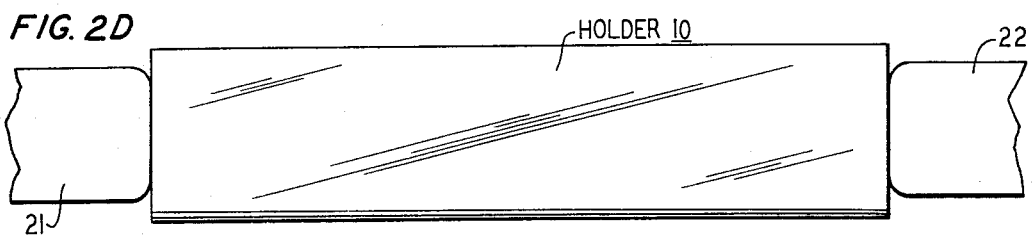

OPTICAL FIBER GROUP SPLICING TECHNIQUE AND APPARATUS EMPLOYING UNIQUE FOLDABLE HOLDER

BACKGROUND OF THE INVENTION

This invention relates to optical fiber wave-guiding structures and, more particularly, to a new technique and apparatus for group splicing optical fiber waveguides.

Optical fiber waveguides are considered as potential replacements for wire pairs, coaxial cable and metallic waveguides in many systems involving the transmission of information and control signals from one point to another. The advantages of fiber systems over conventional systems include the small physical size and light weight of the fibers, the broad bandwidth capabilities which afford flexibility in the selection of a bandwidth to be utilized in any given system, the nonconductive, noninductive properties of the fibers, and the potentially low cost of fiber materials and fabrication. It is generally recognized that a prerequisite to the eventual success of fiber systems is the development of reliable and simple fiber splicing arrangements. It is evident that, to be practical, any technique for splicing fibers must not only be quick and convenient to perform, but must also achieve the ultimate goal of transferring the optical signal power from one fiber to another with a minimum amount of loss at the splice.

Because of the small size of optical fibers (fiber diameters typically range from several micrometers to several mils in size), it is generally considered preferable to be able to handle and splice fibers in groups or bundles, rather than on an individual basis. Optical fiber ribbons are typical group fiber structures in which two or more fiber waveguides are embedded in spaced-apart positions parallel to each other in a ribbon-like outer jacket or sheathing. Numerous techniques and arrangements have been proposed in the art for splicing fiber groups like the fiber ribbon. One of the simplest and more accurate arrangements for aligning the fibers for group splicing involves the use of a chip or wafer with accurately spaced, prefabricated grooves in which the fibers are positioned. Unfortunately, with such arrangements, it has been found that it is difficult to keep the fiber ends clean during the various steps leading from the fiber end preparation for splicing to the final fiber alignment and connection. Particularly, the technique of sliding the fibers into the grooves from both ends of the wafer is likely to contaminate the fiber ends, either by picking up dust particles or other contamination present in the grooves, or by chafing material off the side walls of the grooves. Such end face contamination can greatly increase the optical power loss at the region of the splice.

SUMMARY OF THE INVENTION

The present invention is directed to a new technique and apparatus for group splicing optical fiber waveguides which combine the three steps of fiber end preparation, fiber alignment and fiber connection into an operation that alleviates the end face contamination problem mentioned hereinabove.

In accordance with the present invention, a first group of optical fiber waveguides is spliced to a second, similar group of optical fiber waveguides using a unique foldable holder. The holder illustratively comprises a relatively thin wafer formed of a bendable material, such as a plastic or metal, and includes first and second sections disposed about a centrally extended fold line. Each section of the holder includes a plurality of parallel grooves laterally spaced symmetrically about and parallel to the fold line for receiving and aligning the individual fibers in each group to be spliced. To achieve the desired splice, the fibers in the first group are placed and then fixed in the grooves of the first section of the holder, while the fibers in the second group are placed and then fixed in the second section of the holder. The first group of fibers is disposed in the grooves of the first section oppositely to the second group of fibers in the grooves of the second section so that the two fiber groups are positioned side-by-side throughout the length of the holder. The assembly is then placed in a fiber scoring and breaking tool or other suitable apparatus which divides each of the fibers in the two groups into two parts along the same line perpendicular both to the fiber axis and to the holder fold line. The fiber parts in the first group on one side of the dividing line and the fiber parts in the second group on the opposite side of the dividing line are removed from the holder and discarded. The holder is then folded about its fold line, bringing the fibers in the first group in accurate alignment with the corresponding fibers of the second group to complete the splice.

Unlike most previously proposed fiber-splicing arrangements, the group-splicing technique and unique foldable holder of the present invention advantageously allow the combination of fiber alignment, end preparation and connection in one and the same structure, namely, the holder, so that the fiber ends need not be handled or moved during or between the various steps carried out to effect the splice. The invention also allows the respective fibers to be aligned and fixed in the grooves of the holder before the fiber end surfaces are prepared, so that any contamination resulting from the positioning of the fibers in the grooves of the holder is completely eliminated. The result is a cleaner splice and, consequently, a more efficient transfer of the optical signal power across the splice.

BRIEF DESCRIPTION OF THE DRAWINGS

These and other features and advantages of the invention will be better understood from the following detailed description taken in conjunction with the accompanying drawings in which:

FIGS. 1A and 1B are perspective views of a foldable holder useful for group splicing fiber waveguides in accordance with the invention, FIG. 1A showing the holder in an unfolded position, and FIG. 1B showing the holder in a folded position;

FIGS. 2A through 2D are top views of a foldable holder and two fiber ribbons to be spliced at various stages of an illustrative splicing technique in accordance with the invention;

DETAILED DESCRIPTION

Figure 3A:
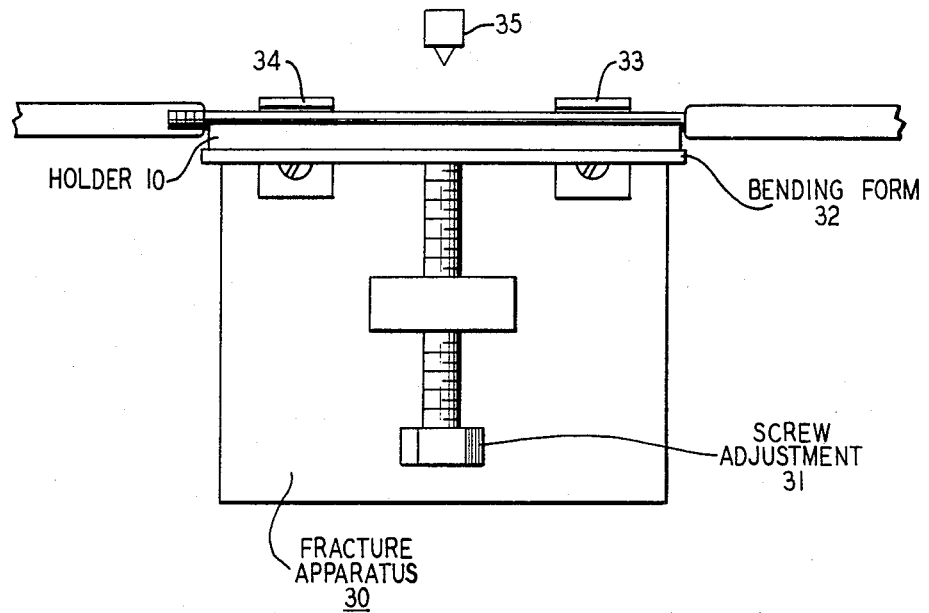
FIGS. 3A and 3B are side views of illustrative apparatus for scoring and breaking the fibers while positioned in the foldable holder along the same line transverse to the holder fold line, FIG. 3A showing the apparatus in an untightened, starting position, FIG. 3B showing the apparatus in a tightened position.

The central element employed in the splicing of optical fiber groups according to the invention is a foldable holder of the type illustrated in FIGS. 1A and 1B of the drawing and denoted 10. Holder 10 illustratively comprises a relatively thin wafer (e.g., about 40 mils or less) formed of a bendable material such as a plastic or metal. Plastics such as an impregnated teflon (to which an epoxy adhesive adheres), and metals such as aluminum, are suitable for holder 10. As shown in FIG. 1A, the upper major surface of holder 10 is divided into two sections, section 11 and section 12 respectively, by a centrally extending fold line 13. Each of sections 11 and 12 includes a plurality of optical fiber receiving grooves 15 and 16, respectively, laterally spaced in a parallel relation symmetrically about fold line 13. The grooves are illustratively V-shaped, with the angle formed by the opposite walls of each groove being 90°, although other groove shapes, such as semicircular or rectangular, and other groove angles, could, of course, be employed. In each case, grooves 15 in section 11 of holder 10 are identical geometrically to grooves 16 in section 12 of the holder and are spaced equal distances away from fold line 13. For purposes of illustration, five grooves are shown in each of sections 11 and 12 for receiving and aligning fiber groups including five optical fibers. Obviously, more or fewer grooves can be provided in each section of holder 10.

Holder 10 is adapted to be foldable about fold line 13 to bring grooves 15 in section 11 in facing alignment over the corresponding grooves 16 in section 12. To facilitate the folding of holder 10, there are illustratively provided two longitudinal strain-relieving grooves 17 on each side of fold line 13 in the upper major surface of the holder. Grooves 17, like fiber receiving grooves 15 and 16, are illustratively V-shaped 90° grooves, but are cut more deeply than grooves 15 and 16. Grooves 17 in addition to facilitating the folding of the holder, serve to assure that the desired facing alignment between grooves 15 and 16 is accurately achieved upon the folding of holder 10. FIG. 1B illustrates holder 10 of FIG. 1A in a folded position achieved by folding section 12 over section 11.

To understand how a foldable holder such as holder 10 of FIGS. 1A and 1B is used in the technique of the invention to achieve fiber splices, reference is now made to FIGS. 2A through 2D of the drawing. As noted above, a common group fiber structure is the optical fiber ribbon in which a plurality of fiber waveguides are embedded in a linear array in spaced-apart positions parallel to each other in a ribbon-like outer jacket. The technique of the invention will be illustratively described hereinafter by reference to the splicing of optical fiber ribbons of this type. It will be apparent, however, that the invention is not limited to the splicing of such fiber ribbons, but can likewise be used to splice other group fiber structures as well as separate fibers.

In the first step of the illustrative technique, the outer jacket is removed along a short length of two fiber ribbons to be spliced to expose the individual fiber waveguides therein. Plastic ribbon jackets can typically be removed by using a suitable solvent, such as acetone, or, alternatively, by mechanically stripping the jacket away from the fibers, such as with a razor blade, in either case taking care not to damage the waveguides. After being thus exposed, the fibers in a first of the two ribbons to be spliced, for example, ribbon 21 in FIG. 2A, are placed into the fiber receiving grooves 15 of section 11 of holder 10 as shown in FIG. 2A. This is illustratively accomplished by first inserting the fiber ends into the grooves at one end of the holder (e.g., the lefthand end) and then sliding the fibers toward the opposite end of the holder (e.g., the righthand end). The contamination that is likely to be gathered by the fiber ends in this sliding movement is not a problem with the technique, since, as will be explained below, new fiber ends are prepared after the fibers are fixed in the holder. Preferably, the exposed fibers are of sufficient length to extend to the end of holder 10, or beyond.

The same procedure is repeated to place the exposed fibers in the second of the two ribbons to be spliced, ribbon 22 in FIG. 2A into grooves 16 of section 12 of holder 10. However, as shown in FIG. 2A, the fibers are inserted from the opposite end of holder 10 (e.g., from the righthand end), so that they extend throughout the holder oppositely to the fibers of ribbon 21. It is noted that the dimensions of grooves 15 and 16 are preferably selected so that the fiber-to-fiber spacing in the holder is the same as that of each of the fiber ribbons.

The fibers in ribbons 21 and 22 are next fixed to holder 10 using a suitable adhesive such as an epoxy. As shown in FIG. 2B, the epoxy is selectively applied to the ends of the fibers that will be retained as part of the final splice. Thus, in FIG. 2B, a drop of epoxy is applied to the lefthand end of the fibers in ribbon 21 and another drop of epoxy is applied to the righthand end of the fibers in ribbon 22.

Figure 3B:
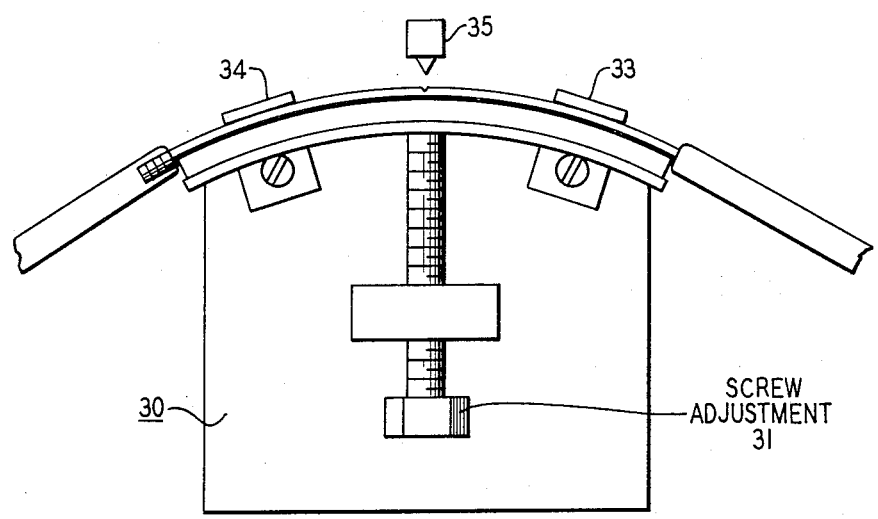

After the epoxy sets, the fibers so fixed in holder 10 are divided into two parts along dividing line 24 which is perpendicular to the fiber axes and to the holder fold line 13. This is illustratively accomplished using fracture apparatus of the type illustrated in FIGS. 3A and 3B of the drawing. Fracture apparatus 30 shown in FIGS. 3A and 3B is a modified version of the fracture apparatus disclosed earlier for individual fibers in the copending application of E. L. Chinnock, D. C. Gloge and P. W. Smith, Ser. No. 412,293, filed Nov. 2, 1973, now U.S. Pat. No. 3,934,773, and assigned to the assignee hereof. The apparatus is compact, typically a few square inches in size, can easily be moved into a cramped or narrow space, and can easily be operated hand-held in any position simply by turning the conveniently located screw adjustment 31.

To achieve the desired fiber division, one starts with fracture apparatus 30 in the untightened position illustrated in FIG. 3A. Holder 10, which includes the fibers of ribbons 21 and 22 fixed therein as explained above, is placed between steel bending form 32 and the two L-shaped pivoting friction plates 33 and 34 so that holder 10 is centered under diamond stylus 35. The spacing between friction plates 33 and 34 is such that, upon the tightening of screw adjustment 31, the fixed fiber ends of one ribbon and the free fiber ends of the other ribbon come to be held side-by-side under a friction plate at each end of holder 10. Screw adjustment 31 is tightened to a point where friction plates 33 and 34 are effective in holding the fibers in each ribbon stationary relative to bending form 32. Diamond stylus 35 is then drawn across the holder along dividing line 24 (e.g., into the plane of the figure) to produce scoring grooves in each of the fibers in the two ribbons. A slight downward pressure of a few grams imparted to stylus 35 is sufficient to produce scoring grooves of a few micrometers in depth in each of the fibers.

Screw adjustment 31 is next tightened further, as shown in FIG. 3B, and bending form 32, holder 10 and the respective fibers fixed therein are bent. Simultaneously, friction plates 33 and 34 slide a small distance toward the outside of bending form 32 as a result of their pivoted connection. This sliding action exerts tension on the fibers in holder 10 so that the desired ratio of tensile to bending stress is achieved in each of the fibers. The mechanical characteristics of bending form 32 primarily determine the stress distribution that results in the fibers and thus, by the proper choice of the bending form thickness, the appropriate ratio of bending to tensile stress can be achieved for the individual fibers, as taught in the above-cited copending application. The combined action causes a fracture to start at each of the scoring grooves and to propagate across each fiber. When the fracture process is completed, the fibers are divided into two parts with flat end faces perpendicular to the fiber axes and situated in the same plane which includes dividing line 24.

For a more detailed explanation of this fracture apparatus, reference should be made to the above-cited copending application.

With the fiber division and end face preparation completed, holder 10 is removed from fracture apparatus 30. The unwanted fiber ends are removed from the holder and discarded to yield the configuration depicted in FIG. 2C of the drawing. Since only the left-hand end of the fibers in ribbon 21 and the righthand end of the fibers in ribbon 22 were fixed to holder 10, the unwanted fiber ends can be removed from the holder by simply pulling. To complete the splice, holder 10 is folded about fold line 13 bringing the individual perpendicular end faces of the fibers of ribbon 21 in position for interfacing with the perpendicular end faces of the fibers of ribbon 22. To improve the optical interconnection of the respective fibers, a small amount of refractive-index-matching liquid can be added to the region of the fiber end faces before holder 10 is completely closed. A transparent index matching epoxy can be used to cement the fibers together if a permanent connection is to be made. Holder 10 is typically left on the fiber as an integral part of the splice. FIG. 2D illustrates the resulting splice configuration.

A primary advantage of the technique of the invention is that it delays the fiber end face preparation step until after the fibers are placed and fixed in the holder, and thereby significantly reduces the likelihood of contamination and of high optical power losses at the region of the splice. Preliminary experimental loss measurements on splices made with the illustrative technique of the invention described above using multimode fibers with a 3 mil core diameter and a 5 mil outer diameter have demonstrated the low susceptibility of the technique to contamination and have yielded average splice losses in the vicinity of 0.1 dB.

In addition, the technique of the invention is relatively quick and convenient to perform. It requires no precision tools or procedures. The final precise alignment of the various fibers is achieved automatically by the grooves in the foldable holder. All of the precision necessary for fiber alignment is introduced in the fabrication of the holder, rather than in the steps performed to effect the splice. Any of a variety of conventional fabrication techniques, such as extrusion, molding, or machining, can be used to produce foldable holders with the desired precision. A particularly convenient way of producing the holders involves a continuous extrusion process which yields a long continuous plastic strip of the desired profile, which can then be cut or sawed into pieces of the appropriate length.

Figure 4A:
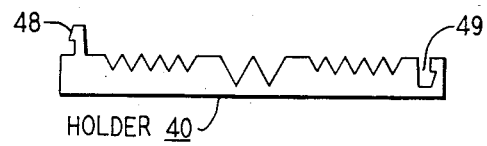
FIGS. 4A and 4B are side views of an illustrative embodiment of the foldable holder of the invention which includes means for latching the holder in a folded position, FIG. 4A showing the holder in an unfolded position, FIG. 4B showing the holder in a folded and latched position.
Figure 4B:

FIGS. 4A and 4B of the drawing illustrate a modified version of the foldable holder which allows the holder to be locked in a folded position. Holder 40 of FIGS. 4A and 4B includes a latching ridge 48 on one side of the holder and a latching groove 49 on the other side of the holder, both of which extend parallel to the fiber receiving grooves and to the holder fold lines (e.g., into the plane of the figure). As shown in FIG. 4B, latching ridge 48 can be engaged within latching groove 49 when holder 40 is folded to lock the holder in the folded position. The holder can then be opened only by expanding latching groove 49 to release latching ridge 48. Holder 40 would be desirable for those applications in which the connection is to be taken apart at some later time, for example, in order to connect to another fiber ribbon. As with the basic holder 10 of FIGS. 1A and 1B, holder 40 can be fabricated with the profile illustrated in FIG. 4A by extrusion of a flexible plastic. Other latching configurations useful in connection with the foldable holder of the invention may be recognized by those skilled in the art.

Figure 5:
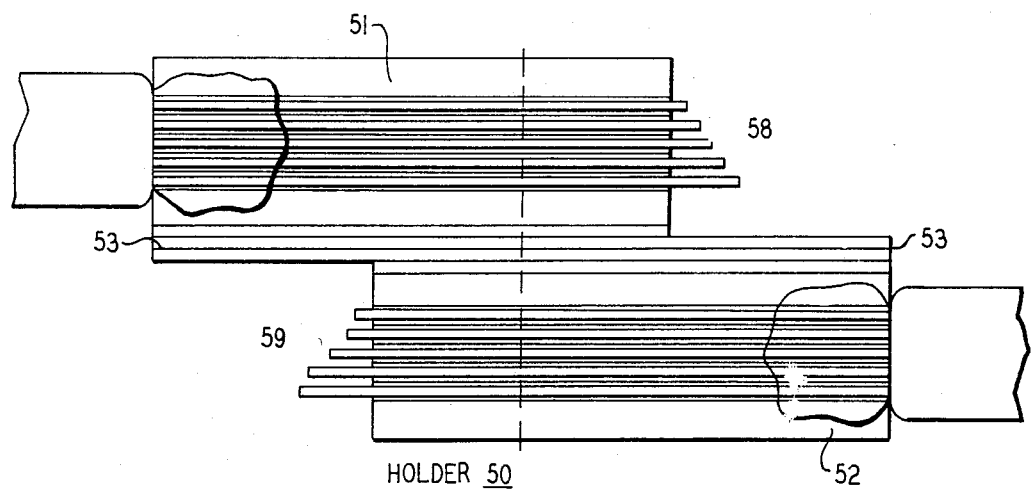
FIG. 5 is a top view of another illustrative embodiment of the foldable holder of the invention.

As was noted above in connection with FIG. 2B of the drawing, the epoxy or other adhesive that is used to fix the fibers in the holder is illustratively deposited in a drop at opposite ends of the holder. Upon a subsequent folding, the hardened epoxy drops, if too thick, tend to keep the holder open at each of its ends. This could be avoided by using only small amounts of epoxy to avoid excessive thicknesses, or by using a holder which, when folded, maintains a gap between the two fiber receiving sections thereof sufficient to accommodate the thickness of the epoxy drops. Alternatively, a foldable holder of the type illustrated in FIG. 5 can be employed. Holder 50 is illustratively identical to holder 10 of FIGS. 1A and 1B, except that sections 51 and 52 are displaced a short distance relative to each other along fold line 53 resulting in the open portions 58 and 59 at opposite ends of the holder. When holder 59 is folded about fold line 53, section 51 extends beyond section 52 at one end of the holder, and section 52 extends beyond section 51 at the other end of the holder. Open portions 58 and 59 thus assure that any adhesive deposited in the manner described above to fix the fibers in the holder does not interfere with the complete closing of the holder. Open portions 58 and 59 can be produced by simply cutting or sawing opposite end portions from the respective fiber receiving sections of a rectangular holder like holder 10 of FIGS. 1A and 1B.

Numerous and varied other arrangements of the invention described illustratively hereinabove may be devised by those skilled in the art without departing from the scope of the invention, as defined by the appended claims.

We claim:

1. A technique for splicing a first group of optical fiber waveguides to a second similar group of optical fiber waveguides, said technique comprising the steps of:

placing the fibers in said first and second groups in a foldable holder that comprises a relatively thin wafer of a bendable material having a major surface, said surface including first and second sections separated by a longitudinal line about which said wafer is foldable, each of said first and second sections including a plurality of longitudinal grooves laterally spaced in a parallel relation symmetrically about said fold line for receiving and aligning the fibers in said first and second groups, respectively, the fibers of said first group being disposed in the grooves of said first section oppositely to the fibers of said second group in the grooves of said second section;

fixing the fibers of said first and second groups to the grooves in said first and second sections of said holder, respectively;

dividing the fibers so fixed in said holder into two parts along the same line perpendicular to said fold line to expose perpendicular end faces of the fibers;

removing from said holder those parts of the fibers of said first group on one side of said dividing line and those parts of the fibers of said second group on the opposite side of said dividing line; and folding said holder about said fold line to bring the fibers of said first group in alignment with the corresponding fibers of said second group.

2. The technique of claim 1 in which said fiber groups are each in the form of an optical fiber ribbon of the type in which a plurality of optical fiber waveguides are embedded in spaced apart, parallel positions relative to each other in a common outer jacket, said technique including the step operative prior to the operation of said placing step of removing the jacket along a portion of said first and second ribbons to be spliced to expose the plurality of fibers therein.

3. The technique of claim 1 in which said dividing step comprises the steps of scoring the fibers in said first and second groups over a region along said dividing line;

mounting said holder and the fibers fixed therein on a relatively flexible bending form with said scored region facing away from said form; and simultaneously bending said form, said holder and the fibers fixed therein thereby applying a nonuniform tensile stress to the fibers which breaks the fibers along said dividing line to yield flat perpendicular end faces thereon.

4. The technique of claim 1 including the step operative prior to the operation of said folding step of applying a refractive index matching material to the exposed perpendicular surfaces of the fibers to improve the optical interconnection of the fibers of said first group and the fibers of said second group upon the folding of said holder.

5. The technique of claim 1 further including the step of fixing said holder in the folded position to permanentize the achieved alignment between said first and second fiber groups.

6. An article useful in the splicing of a first group of optical fiber waveguides to a second similar group of optical fiber waveguides, comprising a relatively thin wafer of a bendable material having a major surface, said surface including first and second sections separated by a longitudinal line, each of said first and second sections including a plurality of longitudinally extended grooves laterally spaced in a parallel relation symmetrically about said line for receiving and aligning the fibers in said first and second fiber groups, respectively, said wafer being foldable about said line to bring the grooves in said first section in facing alignment over the corresponding grooves in said second section.

7. The article of claim 6 including a plurality of optical fiber waveguides positioned in the respective grooves of said first and second sections of said wafer.

8. The article of claim 6 in which said first section of said wafer includes a latching means and said second section of said wafer includes means for engaging said latching means of said first section so that said wafer can be latched in a folded position upon being folded.

9. The article of claim 6 in which said wafer is such that when folded said first section extends beyond said second section at one longitudinal end of said wafer, and said second section extends beyond said first section at the opposite longitudinal end of said wafer.

10. The article of claim 6 in which said wafer is formed of a flexible plastic material.

* * * * *